Patented Feb. 7, 1939

2,146,354

UNITED STATES PATENT OFFICE 2,146,354

PROCESS OF PREPARING ALIPHATIC FLUORINE COMPOUNDS

Otto Scherer, Frankfort-on-the-Main-Hochst, Germany, assignor to I. G. Farbenindustrie Aktiengesellschaft, Frankfort-on-the-Main, Germany No Drawing. Application November 26, 1935, Serial No. 51,711. In Germany November 29, 1934

3 Claims. (Cl. 260—653)

The present invention relates to a process of preparing aliphatic fluorine compounds.

Aliphatic fluorine compounds have hitherto been made by causing the corresponding chlorine compounds to react with antimony trifluoride or hydrogen fluoride in the presence of antimony pentafluoride, pentavalent antimony reacting as a catalyst. Furthermore antimony trifluoride has been used in the presence of bromine, pentavalent antimony being intermediately produced. This procedure has the drawback that besides the real reaction, namely the substitution of fluorine for chlorine, a chlorination or a bromination also occurs when compounds containing hydrogen are used. According to this method it is, for instance, almost impossible to prepare compounds such as methylfluoroform or ethylidene fluoride, since the hydrogen is in part exchanged for chlorine.

Now I have found that aliphatic hydrocarbon chlorides with at least 2 carbon atoms, the chlorine atoms of which are attached only to one carbon atom, for instance, methylchloroform or ethylidene chloride can also be fluorinated at a raised temperature with the aid of a fluorinating agent, but without the addition of pentavalent antimony. As fluorinating agent there is suitable antimony trifluoride or substantially anhydrous hydrogen fluoride. The reaction proceeds more rapidly and more completely if the process is conducted at a raised pressure. The yields of fluorinated product are very high and increase with enhanced exclusion of water in the reaction.

The following examples serve to illustrate the invention, but they are not intended to limit it thereto:

(1) In an iron vessel resistant to pressure, methyl-chloroform is mixed with $SbF_3$ or HF. The vessel is heated to about 150° C. During this operation the pressure very soon rises. If as fluorinating agent hydrogen fluoride is used, hydrochloric acid is then discharged by means of a valve. After 1 to 2 hours the reaction is complete. According to the quantity of the fluorinating agent used there is obtained $CCl_2F-CH_3$, $CClF_2-CH_3$ or $CF_3-CH_3$ (2) Under the same conditions as described in Example 1 there is obtained from ethylidene chloride, according to the experimental conditions, $CHClF-CH_3$ or $CHF_2-CH_3$.

I claim:
1. In the process of preparing aliphatic fluorine compounds the step which consists in heating in a closed vessel practically anhydrous hydrogen fluoride and an aliphatic hydrocarbon with two carbon atoms containing at least two chlorine atoms at only one carbon atom.

2. In the process of preparing aliphatic fluorine compounds the step which consists in heating in a closed vessel practically anhydrous hydrogen floride and methylchloroform at a temperature of about 150° C.

3. In the process of preparing aliphatic fluorine compounds the step which consists in heating in a closed vessel practically anhydrous hydrogen fluoride and ethylidene chloride at a temperature of about 150° C.

OTTO SCHERER.